US010859468B2

(12) United States Patent
Taylor et al.

(10) Patent No.: US 10,859,468 B2
(45) Date of Patent: Dec. 8, 2020

(54) METHOD AND DEVICE FOR TYRE CONDITION ANALYSIS (71) Applicant: Wheelright Limited, Begbroke (GB)

(72) Inventors: Paul Michael Taylor, Oxfordshire (GB); William James Bradley, Cambridgeshire (GB); Willem Paul Beeker, Cambridgeshire (GB); Alexander Paul Codd, Oxfordshire (GB)

(73) Assignee: Wheelright Limited, Begbroke (GB)

( * ) Notice: Subject to any disclaimer, the term of this patent is extended or adjusted under 35 U.S.C. 154(b) by 258 days.

(21) Appl. No.: 15/031,587

(22) PCT Filed: Oct. 21, 2014

(86) PCT No.: PCT/GB2014/053132
§ 371 (c)(1),
(2) Date: Apr. 22, 2016

(87) PCT Pub. No.: WO2015/059457
PCT Pub. Date: Apr. 30, 2015

(65) Prior Publication Data
US 2016/0258842 A1 Sep. 8, 2016

(30) Foreign Application Priority Data

Oct. 24, 2013 (GB) .................................. 1318824.8

(51) Int. Cl.
*G01M 17/02* (2006.01)
*G01B 11/22* (2006.01)
(52) U.S. Cl.
CPC ........... *G01M 17/027* (2013.01); *G01B 11/22* (2013.01)
(58) Field of Classification Search
None
See application file for complete search history.

(56) References Cited

U.S. PATENT DOCUMENTS 4,095,464 A  6/1978  Breedijk
4,604,648 A * 8/1986  Kley ................ G01N 21/95684
                                                        348/131
(Continued)

FOREIGN PATENT DOCUMENTS

DE    1809459 A1   6/1970
DE    4316984 A1   8/1994
(Continued)

OTHER PUBLICATIONS

International Search Report and Written Opinion dated Apr. 17, 2014, in corresponding International Application No. GB1318824.8.

(Continued)

*Primary Examiner* — Jill E Culler
(74) *Attorney, Agent, or Firm* — Bookoff McAndrews, PLLC (57) ABSTRACT A system for measuring the depth of tread of a tyre (5) on a wheel (2) of a vehicle (1) whilst the wheel is rotating and moving along the ground. A camera (3) captures images whilst the tyre rotates for at least the major part of its circumference. Light sources (L1 to L4) are spaced longitudinally and are directed at an acute angle to the path of the tyre, to illuminate the tyre whilst images are captured. The images are analysed by data processing apparatus (8) and the tread depth is determined from the length of shadows (12, 13) in the gaps (11) between tread blocks (10). The light sources are activated and de-activated sequentially in accordance with signals from longitudinally spaced sensors (S1 to S4) which detect the presence of the tyre, so that when an image is captured of a portion of the tyre tread, only one light source is activated to illuminate that portion of the tyre tread.

20 Claims, 3 Drawing Sheets

(56) References Cited

U.S. PATENT DOCUMENTS

| | | | |
|---|---|---|---|
| 5,245,867 A | 9/1993 | Sube et al. | |
| 5,936,737 A * | 8/1999 | Naumann | F02K 9/50 356/613 |
| 5,987,978 A | 11/1999 | Whitehead | |
| 6,674,531 B2 * | 1/2004 | Mahner | G01B 11/2441 356/35.5 |
| 6,768,551 B2 * | 7/2004 | Mian | B61K 9/12 250/559.23 |
| 7,456,973 B2 * | 11/2008 | Steinbichler | G01B 11/162 356/35.5 |
| 7,466,430 B2 * | 12/2008 | Braghiroli | G01M 1/02 356/601 |
| 7,564,569 B2 * | 7/2009 | Mian | B61K 9/12 250/559.22 |
| 7,578,180 B2 * | 8/2009 | Lionetti | G01B 7/26 73/146 |
| 7,797,995 B2 * | 9/2010 | Schafer | B60C 11/24 73/146 |
| 7,975,540 B2 | 7/2011 | Angell et al. | |
| 8,171,783 B2 | 5/2012 | Tracy | |
| 8,542,881 B2 | 9/2013 | Teti et al. | |
| 9,239,274 B2 * | 1/2016 | Joly | G01M 17/027 |
| 9,539,866 B2 * | 1/2017 | Mouchet | G07C 5/0808 |
| 2005/0268707 A1 | 12/2005 | Dale, Jr. et al. | |
| 2006/0232787 A1 | 10/2006 | Hoffmann et al. | |
| 2007/0019640 A1 | 1/2007 | Thiede | |
| 2008/0256815 A1 | 10/2008 | Schafer | |
| 2012/0020526 A1 | 1/2012 | Teti et al. | |
| 2012/0067115 A1 | 3/2012 | Pingel | |
| 2014/0232852 A1 | 8/2014 | Nobis et al. | |
| 2015/0330773 A1 * | 11/2015 | Uffenkamp | G01B 11/22 356/631 |

FOREIGN PATENT DOCUMENTS

| | | |
|---|---|---|
| EP | 0469948 A1 | 2/1992 |
| EP | 1967835 A2 | 9/2008 |
| EP | 2106530 A1 | 10/2009 |
| EP | 2141475 A1 | 1/2010 |
| JP | 2008-185511 | 8/2008 |
| JP | 2009-139268 A | 6/2009 |
| JP | 2012-154858 A | 8/2012 |
| JP | 2012-523547 A | 10/2012 |
| WO | WO 96/10727 | 4/1996 |
| WO | WO 97/07380 | 2/1997 |
| WO | WO 2008/080385 A1 | 7/2008 |

OTHER PUBLICATIONS

International Search Report and Written Opinion dated Jan. 7, 2015, in corresponding International Application No. PCT/GB2014/053132.

Chinese Office Action in corresponding Chinese Application No. 2018012601758790, dated Jan. 31, 2018 (8 pages).

* cited by examiner

METHOD AND DEVICE FOR TYRE CONDITION ANALYSIS

This invention relates to a method and apparatus for assessing the condition of a vehicle tyre on a wheel, whilst the wheel is rotating and the vehicle is moving. In particular, the invention is concerned with measuring the depth of tread on the tyre.

A system is disclosed in U.S. Pat. No. 5,987,978 for measuring the tread depth of a tyre. In one embodiment, a light source is used to illuminate a tyre obliquely, in such a way that shadows are formed within the recessed portions of the tread pattern. A second light source is provided for illuminating the tyre from a different direction. The first and second light sources may be arranged to operate in an alternating sequence and may be arranged such that the light they produce comes from opposing directions. Those portions of the tyre which are illuminated will reflect a greater intensity of light that those portions at the bottom of the treads which are in a shadowed region. By comparing the reflected light patterns when the tyre is illuminated from each side it is possible to work out the depth of the tread. It is stated that as the tyre wears, the depth of the tread grooves decreases and eventually they will wear down to such an extent that light can be reflected from the bottom of the grooves. It is stated that once this occurs, the width of the shadow is directly related to the depth of the tread. The reflected light is directed towards a camera, where the image is captured and sent to a data processor for processing. The apparatus of U.S. Pat. No. 5,987,978 does not measure the tread depth of a tyre at multiple positions around its circumference, whilst the tyre is rotating and moving along a surface. Instead, the tyre may be rotated on a test bed such as a rolling road, or a sensor may be moved around the periphery of a tyre, for example during a roadside inspection.

In U.S. Pat. No. 8,542,881 there is disclosed a computer vision aided automated tyre inspection system for in-motion inspection of vehicle tyres. A camera at an image acquisition station captures digital images of tyres of an approaching vehicle, and in particular the treads and sidewalls as the vehicle passes through an inspection station. There is a light at the image acquisition station, and this may also be physically separate from the image acquisition station. Sufficient images are captured to cover an entire revolution of a tyre. It is stated that the images are analysed to determine tyre tread depth. There is no disclosure of how the tread depth is measured, using the images.

An objective of the present invention is to provide an effective system for measuring the tread depth of a tyre at multiple positions around its circumference, whilst the tyre is, rotating and moving longitudinally over a base.

In accordance with one aspect, the present invention provides a method of assessing the condition of a tyre on a wheel which is mounted on a vehicle, while the vehicle is moving and the tyre is rotating and moving longitudinally along a path of movement over a base, the periphery of the tyre having tread portions separated by tread gaps; in which the method comprises using an imaging device to capture images of a plurality of different portions of the periphery of the tyre whilst the tyre completes at least a major part of a complete revolution, the images being captured whilst a light source is activated to illuminate the portions of the periphery of the tyre; and the images are analysed to determine the depth of the tread gaps; wherein
a series of a plurality of light sources is positioned to one side of the path of movement of the tyre, each light source being a point source of non-collimated light and directing light at an acute angle to the path of movement of the tyre; the light sources being spaced from each other in a longitudinal direction;
a control system is configured to activate the light sources sequentially whilst the tyre moves along said path of movement, so that only one of said light sources of the series illuminates the tyre when images are being captured by the imaging device;
when a light source is activated to illuminate a portion of the periphery of the tyre, the light source causes shadows to be cast in the tread gaps between tread portions; the imaging device is operated to collect an image of at least part of the illuminated portion of the periphery of the tyre; and the image is analysed by data processing apparatus which determines the extent of the shadow in a tread gap so as to provide an indication of the depth of the tread gap.

In accordance with another aspect, the present invention provides apparatus for assessing the condition of a vehicle tyre on a wheel, whilst the tyre is rotating and moving longitudinally along a path of movement over a base, the periphery of the tyre having tread portions separated by tread gaps; in which the apparatus comprises an imaging device and a light source, the imaging device being arranged to capture images of a plurality of different portions of the periphery of the tyre whilst the tyre completes at least a major part of a complete revolution, the images being captured whilst the light source is activated to illuminate the portions of the periphery of the tyre; and a data processing system configured to process the images to enable the depth of the tread gaps to be determined; wherein
a series of a plurality of light sources is positioned to one side of the path of movement of the tyre, each light source being a point source of non-collimated light and directing light at an acute angle to the path of movement of the tyre; the light sources being spaced from each other in a longitudinal direction;
a control system is configured to activate the light sources sequentially whilst the tyre moves along said path of movement, so that only one of said light sources of the series illuminates the tyre when images are being captured by the imaging device;
when a light source is activated to illuminate a portion of the periphery of the tyre, the light source causes shadows to be cast in the tread gaps between tread portions; the imaging device being arranged to collect an image of at least part of the illuminated portion of the periphery of the tyre; and data processing system is configured to analyse the image so as to determine the extent of the shadow in a tread gap so as to provide an indication of the depth of the tread gap.

Thus, images are obtained of the surface of the tyre whilst the wheel and tyre are moving along the path of movement, which can be either towards or away from the imaging device and the light sources, for at least a major portion of the circumference of the wheel, i.e. at least about one half. During the imaging process, there will be a considerable change in distance between the imaging device and the surface being imaged. For example if a tyre has a diameter of about a metre, half of the circumference would be over 1.5 m. The imaging device will be arranged to collect images, in focus, of the rotating tyre whilst the tyre moves towards or away from the imaging device by this distance. For larger tyres and/or to collect images over a greater portion of the tyre, the imaging device will collect images whilst the tyre moves towards or away from the imaging device a greater distance. Being able to collect multiple images, in preferred embodiments covering the entire circumference of the tyre, while the vehicle is moving along, is a considerable advantage in terms of the usability of the system as opposed to that of U.S. Pat. No. 5,987,978.

The use of a plurality of light sources which are spaced longitudinally and activated sequentially whilst the wheel moves along said path of movement so that, when an image is captured, only one light source is illuminating the tyre, means that there is always sufficient illumination of the tyre so that a good image can be obtained, whilst the use of only a single point source of light means that well defined shadows can be obtained and analysed to determine tread depth. Each light source provides a zone of illumination and the path of movement of the wheel extends through the plurality of zones, moving from one to the next. In a preferred embodiment, the illumination zones overlap. When the wheel is wholly within a first zone, a first light source is activated and the second light source is not activated. When the wheel has entered the area of overlap with the second zone, the first light source is de-activated and the second light source is activated. Similarly, when the wheel has entered the area of overlap with a third zone, the second light source is de-activated and the third light source is activated. This continues until the penultimate light source in the series is de-activated and the final light source is activated. When it is said that a wheel has entered the area of overlap, this includes taking action as the wheel enters the zone, immediately after the wheel entering the zone, or at any other suitable time when the wheel is in the zone of overlap.

It will be appreciated that if the zones of illumination do not overlap, there will be a region of the periphery of the tyre which is not brightly illuminated during its path through the system, so there will be a gap in images of high quality if the intention is the capture images around the entire periphery of the tyre.

A zone of illumination will generally be (in two dimensions) in the form of a segment which is centred around the principal direction in which the output of the light source is directed. In three dimensions the zone of illumination could be conical, but it may be preferable to shape the output of the light source so that the cross section is not circular but is, for example, elliptical.

When it is said that the light sources are spaced longitudinally, this does not imply that all of the light sources lie on a line which is parallel to the path of movement of the tyre, although in some embodiments the light sources will lie on such a line or on one which is generally parallel to the path of movement of the tyre. However, the light sources could lie on a line which is somewhat inclined with respect to the parallel direction, or the light sources may not lie on a line at all. The light sources in the series may be evenly spaced or generally evenly spaced, or there may be variation in the spacing.

In accordance with the invention, the method does not involve the use of a laser or other collimated light to illuminate the tyre. Instead the system uses suitably directed non-collimated illumination, which illuminates a significant portion of the tyre periphery rather than providing a scan line. The light source is preferably chosen to be bright enough to be the dominant light source illuminating the tread, having regard to background ambient light. In some embodiments a light source offering several thousand lumens is preferred. such as a metal halide lamp or a light emitting diode (LED) or a number of LEDs which are mounted together so that they act as a substantially point source of light. In general, the expression "point source" encompasses a plurality of light sources which are arranged adjacent each other and, for the purposes of illumination the tyre and the creation of a well-defined shadow, effectively operate as a point light source.

The light sources should be the dominant light source but in many cases there will be ambient lighting such as daylight. The provision of ambient light may assist in controlling the contrast in the images. This could be achieved by ensuring that there is sufficient daylight, or by providing sufficient background illumination by general artificial lighting, particularly if the system is used under cover, such as indoors, or the system is used at night or at time when there is insufficient daylight. In some cases, it may be desirable to use a specific secondary source of light which is of lower intensity than each light source in the series.

The imaging device should have a sufficient depth of field and frame rate so that the surface of the tyre can be imaged multiple times as the tyre is rolling forwards. The ability to image the tyre will depend on the geometry of the tyres and the camera location; the speed of the vehicle; the imaging device resolution; the field of view of the imaging device; the exposure time; the lighting conditions; and environmental conditions. The images captured may be colour or greyscale. If colour images are captured, in subsequent evaluation of tread depth, greyscale images may be used in some embodiments.

Operation of the imaging device will typically commence when the wheel reaches a triggering point which can be detected by any known detector system, whether mechanical, optical, magnetic, electric or otherwise. The triggering point can also be used to initiate sequential activation of the light sources.

If the speed of the vehicle is determined, the sequence of activation and de-activation of the light sources sequentially can be time based. In a preferred embodiment, however, there are sensors to detect when a tyre is in a suitable position for a light source to be de-activated and the next light source activated. In some cases it may be necessary to have adjacent light source activated together so that there are overlapping zones of illumination. This could occur if, for example, there is a vehicle such as a heavy goods vehicle tractor unit which has axle spacing about the same as the distance between the sensors that activate/de-activate the light sources, so that a leading wheel and a trailing wheel operate the sensors at about the same time. This could result in adjacent light sources being activated at the same time, but the light sources are operated in a controlled manner so that the tyre is not in the region of overlapping illumination when images are captured. For example, a first light source would be de-activated before the tyre enters the region of overlap. This may restrict the amount of the circumference of the tyre on the trailing wheel that is imaged or imaged effectively.

Typically, the imaging device is a conventional camera which is used to take a series of still images, and preferably a digital camera. However, a video camera could be used and individual frames inspected, or a specialist imaging device used.

It has been found that the overall imaging resolution is dependent on the imaging device resolution, the distance between the imaging device and the target, the viewing angle, curvature distortion and motion blurring. Moving the camera closer to the target improves the "best" resolution but worsens the "worst" resolution. Moving the camera away achieves more consistent performance.

Motion blur increases as the target moves up the tyre, away from the surface, but surface resolution improves due to the angle of the tyre surface.

A high resolution camera will provide a higher resolution per image, but may be unable to take the images sufficiently quickly to cover the entire periphery of the tyre in one pass.

The highest resolution of the tyre surface will be when the camera is closest to the tyre. However, if the camera is sharply focused when close, the focus further away will be poor. To obtain better average resolution it may be preferred to have a larger minimum focal length but a better depth of field.

A smaller aperture will provide a greater depth of field. However, there will then be required stronger illumination and/or a longer exposure time—which increases motion blur.

It has been determined that when using a camera it is not easy to autofocus and zoom between shots, particularly if illumination is by a strobe light or a flash and the tyre is dark between shots. It is thus preferred, in some embodiments, to have a fixed focal length lens, with an aperture that is set sufficiently small to give a depth of field that spans the distance that the vehicle travels for at least one revolution of the wheel, or such other distance travelled whilst images are being captured. The exposure must be sufficiently short to avoid motion blur, and this necessitates the use of a very bright illumination source.

In some embodiments, the imaging device is operated to collect multiple images whilst the tyre completes at least about 50% of a complete revolution of the tyre; or at least about 55% of a complete revolution of the tyre; or at least about 60% of a complete revolution of the tyre; or at least about 65% of a complete revolution of the tyre; or at least about 70% of a complete revolution of the tyre; or at least about 75% of a complete revolution of the tyre; or at least about 80% of a complete revolution of the tyre; or at least about 85% of a complete revolution of the tyre; or at least about 90% of a complete revolution of the tyre; or at least about 95% of a complete revolution of the tyre; or at least a complete revolution of the tyre.

Where it is stated that images are collected of different portions spaced around the said outer surface of the tyre, this does not imply that there is necessarily a continuous series of images covering the entire periphery of the outer surface of the tyre, although that is a feature of a preferred embodiment of the invention and in that embodiment of the invention there are sufficient images to provide a continuous series which cover the outer periphery of the outer surface of the tyre. The images may be of overlapping portions of the outer surface of the tyre. In an alternative embodiment, the images may be in respect of circumferentially spaced portions of the outer surface of the tyre, so that there is a discontinuous series of images around the periphery of the outer surface of the tyre. In such an arrangement, the images between them preferably cover at least about 50% of the periphery of the tyre; or at least about 55% of the periphery of the tyre; or at least about 60% of the periphery of the tyre; or at least about 65% of the periphery of the tyre; or at least about 70% of the periphery of the tyre; or at least about 75% of the periphery of the tyre; or at least about 80% of the periphery of the tyre; or at least about 85% of the periphery of the tyre; or at least about 90% of the periphery of the tyre; or at least about 95% of the periphery of the tyre.

In some embodiments of the invention, images are not collected completely up until a revolution has been completed and there may be a gap from the final image collected to the completion of the revolution. In preferred embodiments, images are collected during a continuous period covering at least about 50% of a complete revolution of the tyre; or at least about 55% of a complete revolution of the tyre; or at least about 60% of a complete revolution of the tyre; or at least about 65% of a complete revolution of the tyre; or at least about 70% of a complete revolution of the tyre; or at least about 75% of a complete revolution of the tyre; or at least about 80% of a complete revolution of the tyre; or at least about 85% of a complete revolution of the tyre; or at least about 90% of a complete revolution of the tyre; or at least about 95% of a complete revolution of the tyre; or at least a complete revolution of the tyre.

It will be appreciated that in some circumstances it will not be possible to image at 50% of the periphery of a tyre, for example when a tyre is obscured by another tyre to the front, or the side, and/or there is structure of the vehicle which obscures the tyre. The amount of the tyre circumference that can be imaged may be as low as 10% or even less. In that case, the method of the invention is only applicable to other tyres on the vehicle which are not so obscured. The apparatus of the invention is still capable of collecting sufficient images of a tyre, even if one or more tyres of a vehicle cannot be imaged sufficiently, or at all, and even if no tyres of a particular vehicle can be imaged sufficiently, or at all.

In embodiments where images are collected during a continuous period covering less than a complete revolution of the tyre, the images will cover only a portion of the entire periphery of the tyre. The images may cover the entire portion of the periphery of the tyre during that part of the revolution of the tyre, and the images may overlap. In an alternative arrangement the images may be in respect of circumferentially spaced portions of the outer surface of that portion of the periphery of the tyre, so that there is a discontinuous series of images around that portion of the periphery of the outer surface of the tyre. In such an arrangement, the images between them preferably cover at least about 50% of that portion of the periphery of the tyre; or at least about 55% of that portion of the periphery of the tyre; or at least about 60% of that portion of the periphery of the tyre; or at least about 65% of that portion of the periphery of the tyre; or at least about 70% of that portion of the periphery of the tyre; or at least about 75% of that portion of the periphery of the tyre; or at least about 80% of that portion of the periphery of the tyre; or at least about 85% of that portion of the periphery of the tyre; or at least about 90% of that portion of the periphery of the tyre; or at least about 95% of that portion of the periphery of the tyre.

Where it is said that each image is in respect of different portions around the periphery of the tyre, this does not exclude the possibility that two images could be taken in very quick succession so that, in effect, they are in respect of substantially the same portion of the tyre.

Where there is a reference to an image of a portion of the periphery of the outer surface of the tyre, this does not imply that the entire width of the outer surface of the tyre is imaged; and/or that an indication of tread depth is provided in respect of the entire width of the outer surface of the tyre. That is, however, a feature of a preferred embodiment of the invention. In another embodiment only a portion of the width of the outer surface of the tyre is imaged; and/or an indication of tread depth is provided in respect of only a portion of the width of the outer surface of the tyre. This portion of the width of the outer surface of the tyre base could be a percentage of the outer surface of the tyre which will be in contact with the base. This could be at least the percentage established by any relevant legislation. For example, in the United Kingdom there must be a specified minimum tread depth over the central 75% of the tread. Thus for example, the width imaged and analysed may be at least the central 75% of the tread that will be in contact with the base, or at least about the central 80% of the tread, or at least about the central 85% of the tread, or at least about the central 90% of the tread, or at least about the central 95% of the tread. Expressed in another way, the width imaged and analysed may be at least the central 75% of the outer surface of the tyre that will be used to contact the base, or at least about the central 80% of the outer surface of the tyre that will be used to contact the base, or at least about the central 85% of the outer surface of the tyre that will be used to contact the base, or at least about the central 90% of the outer surface of the tyre that will be used to contact the base, or at least about the central 95% of the outer surface of the tyre that will be used to contact the base.

In some embodiments, the images are used to detect defects in the tread over the outer surface of the tyre, such as cuts, flat spots and bulges. This could be done by manual inspection or by using the data processing apparatus. Additionally or alternatively, the images may include portions of the two sidewalls of the tyre, one on either side of the outer surface of the tyre which is in contact with the base. The images can then be used to detect defects in the sidewalls of the tyre such as cuts or bulges. Again, this could be done by manual inspection or by using the data processing apparatus.

In accordance with the invention, the light source is displaced at an acute angle to one side of said path of movement so as to be able to create shadows in the tread gaps of the tyre. The light source may be displaced to either side of the path of movement. The imaging device may also be displaced at an acute angle to one side of said path of movement. In that case the imaging device may be displaced to the same side of the path of movement as the light source, or to the other side of the path of movement. It would also be possible for the imaging device to face along the path of movement. In this case, the tyre would normally drive over the imaging device, which could for example be spring loaded or mounted under a transparent plate or under a prism so that it is not damaged when the tyre passes overhead.

One potential advantage of an imaging device that faces the tyre head on, is that it may be possible for a single imaging device to capture images of both sidewalls of the tyre. However, it may be necessary for mirrors to be provided to make the side walls visible.

In some embodiments, a supplementary imaging device is used to capture images of portions of a sidewall of the tyre. It might be possible to provide a supplementary light source for the supplementary imaging device, but if both this and light sources in the series are operated simultaneously, the arrangement should be that they do not interfere with each other in such a way as to remove or diminish the shadows that are required for putting the invention into effect.

In some embodiments, two supplementary imaging devices are used, one on either side of the outer surface of the tyre. The images can then be used to detect defects in the sidewalls of the tyre. Again, this could be done by manual inspection or by using the data processing apparatus.

In a preferred arrangement, the imaging device is arranged to target a part of the tyre adjacent the base over which the tyre is moving, and extending upwardly for a distance from that base. This is to avoid obstruction by portions of bodywork or other items such as mud flaps.

The imaging device may operate to capture images of the front of the tyre as it moves towards the imaging device, or to capture images of the rear of the tyre as it moves away from the imaging device. In some arrangements it would be possible to have two imaging devices, one to capture images of the rear of the tyre and one to capture images of the front of the tyre. The two series of images could be used together, for example by images of tyre portions captured by the rear camera being interleaved with images of portions captured by the front camera, the portions of the tyre captured by the rear camera being different from the portions of the tyre captured by the front camera.

Vehicles will have a plurality of tyres on one side, and it would be possible to have a plurality of imaging devices which can capture images of different tyres simultaneously. This may be useful where there are closely spaced axles, such as on some heavy goods vehicles.

In a preferred arrangement, tyres on both side of a vehicle can be inspected at the same time. Thus preferably, the arrangement of an imaging device and light source, or a plurality thereof, to image wheels on one side of a vehicle is repeated on the other side of the vehicle, for example being mirrored.

All of the features discussed above in relation to tyres on one side of a vehicle are equally applicable to tyres on opposite sides of the vehicle.

In some cases a single axle can have two wheels on one side of the vehicle and two wheels on the other side of the vehicle. In this case the outer wheel of a pair may obstruct the inner wheel of the pair. To cope with such an arrangement, it may be desirable to have a first arrangement of light source and imaging device to capture images of the outer wheel, and a second arrangement of light source and imaging device to capture images of the inner wheel. Again, this could be duplicated on both sides of the vehicle. If two tyres are mounted next to each other on an axle, it may not be possible to image the facing sidewalls of the tyres, at least completely.

In one preferred embodiment, the imaging device and the series of light sources are on opposite sides of the path of movement of the wheel/tyre, i.e. one of the imaging device and the series of light sources is situated on one side of the path of movement of the wheel/tyre and the other is situated on the other side of the path of movement. Thus, the light sources could be arranged to one side, beyond the vehicle, whilst the imaging device is positioned in line with the vehicle; or the reverse arrangement could be used. If tyres on both sides of the vehicle are analysed at the same time, the arrangement could be reproduced on the other side of the vehicle. In one preferred arrangement in which tyres on both sides of a vehicle are analysed, two imaging devices are provided at positions which will be within the outline of the vehicle, whilst the light sources are provided to the sides, outside the outline of the vehicle. Alternatively, the imaging devices could be provided to the sides, outside the outline of the vehicle, whilst the light sources are provided at positions which will be within the outline of the vehicle.

In embodiments of the invention, the angle of the light impinging on the tyre will affect the amount of shadow. If the path of illumination is close to normal to the surface of the tyre, there will be little or no shadow cast and the entire tread gap will be illuminated. If the light shines across the surface of the tyre, the complete tread gap will be in darkness.

If the light extends at a suitable angle to the tread gap, a shadow will be cast which extends down the side of the tread gap, and across the base of the tread gap. The deeper the tread gap, the longer the extent of the shadow down the side of the tread gap and the longer the extent of the shadow across the base of the tread gap, away from the base of the side wall. The length of the shadow down the side of the tread gap may be analysed. There could be provided an absolute measurement of the depth, or merely an indication as to whether it complies with a minimum depth requirement. Additionally or alternatively, the extent of the shadow across the base of the tread gap may be analysed.

In preferred embodiments of the invention, analysis of an image determines the location of a wheel and tyre combination and then determines the centre of the wheel. This can then be the basis for calculating distances and angles. In putting the invention into effect it has to be borne in mind that the distance to the tyre from the imaging device is changing continuously, so that the scale on the images will change and this has to be taken into account when calculating the actual length of a shadow. This could be done by there being in each image an item which is of known size which can be assessed to set the scale, such as the wheel diameter or radius, or the tyre diameter or radius, and locating the centre of the wheel will assist in this. The tyre or wheel dimension could be known in advance, or could for example be determined by comparing the dimension of the item to a scale mounted at a known distance from the camera, the item and the scale appearing in an image. Thus broadly, a scaling factor is applied by reference to an item of known actual size which is present in each image. The item may be at least a part of the wheel. The dimension of the wheel may be known, and stored. Alternatively the dimension of the wheel is measured. The dimension of the wheel could be measured against a scale which appears in an image with the wheel, in which the wheel and the scale are at the same distance from the imaging device.

An alternative, and preferred, arrangement is to use a calibration step, in which an item having known dimensions is positioned at a known distance from the imaging device. The item could be a chart with markings on it. By viewing an image of the chart or other item at this known distance, a scaling factor can be applied which, for example, will relate the number of image pixels in a particular direction to a real distance. In practice, the known distance from the imaging device will be at the same distance as a device to trigger the commencement of a series of images. Thus, the distance of the tyre from the imaging device, at the time of the first image, will be known.

Where the imaging device is displaced sideways from the path of movement, geometrical calculations can be carried out to determine the distance to the tyre for subsequent images. The angle of the imaging device with respect to the path of movement is fixed. As the vehicle moves along the path of movement the position of an item on the vehicle, such as the tyre or a wheel, will shift across the field of view of the imaging device. By a calibration step or another means, the amount of shift of the item across the field of view—for example measured in pixels—can be related to the distance travelled along the path of movement. Thus, using geometric calculations, it is possible to calculate the distance to the tyre just by inspecting the images, providing there has been suitable calibration.

Account also needs to be taken of distortions caused by the geometry of the arrangement, with the camera displaced to the side of the vehicle which is moving. The camera may be inclined upwardly at the tyre but its path may not be normal to the surface of the tyre. The tyre will have a curved surface and the curvature will depend on the tyre radius In some embodiments, the general procedure involves the following steps:
1) Measure the distance between the tyre and the imaging device in a known geometry.
2) Capture images, whilst operating light sources sequentially, as described above.
3) Filter images to try to eliminate lighting variations,
4) Filter images to try and detect valid groove shadows as opposed to other dark areas.
5) Integrate shadow values.
6) Convert to actual shadow size.
7) Calculate tread depth from shadow size.

In some embodiments of the invention, the vehicle may travel at up to about 20 miles per hour (32 kph or more generally up to about 30 kilometres per hour), with preferred speeds being up to about 5 miles per hour (8 kph or more generally up to about 10 kilometres per hour) or up to about 10 miles per hour (16 kph or more generally up to about 15 kilometres per hour) or up to about 15 miles per hour (24 kph or more generally up to about 25 kilometres per hour). In some embodiments the vehicle should be travelling at at least about 5 miles per hour (8 kph or more generally at least about 10 kilometres per hour).

In some embodiments of the invention, a sensor detects the presence of the vehicle and triggers operation of the imaging device(s) and the light source(s). There may be a sensor or sensors for detecting vehicle speed, or the images may be inspected to calculate vehicle speed.

Some embodiments of the invention will now be described by way of example and with reference to the accompanying drawings, in which.

Figures 1, 2:
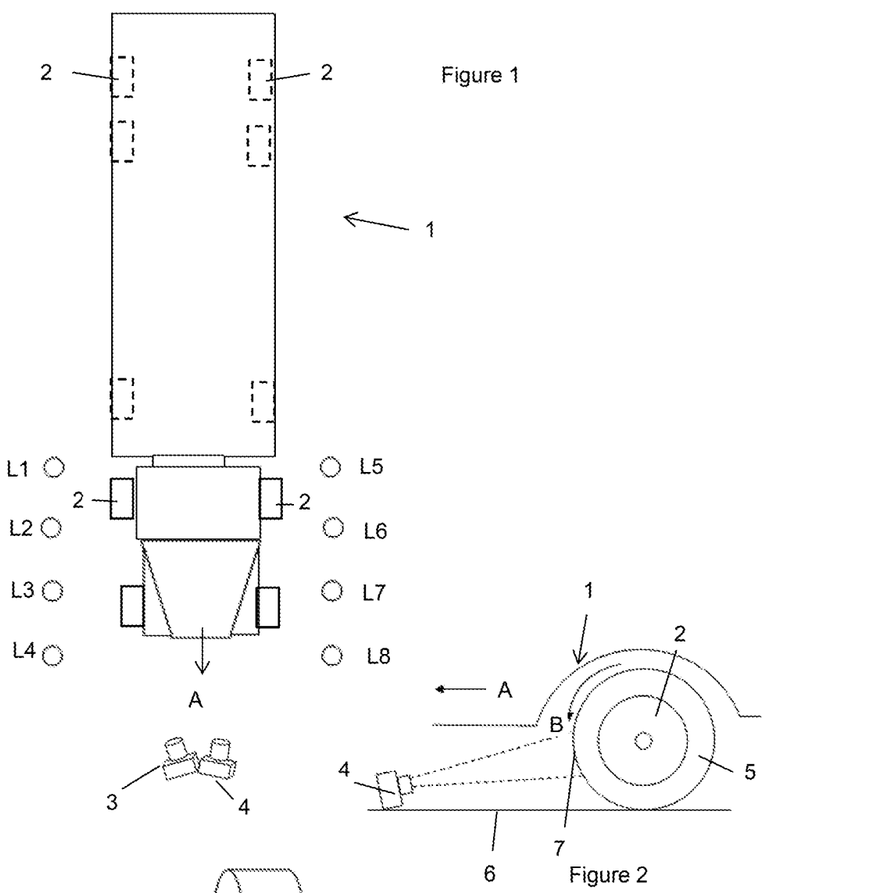
FIG. 1 is a diagram of an embodiment of a system used for carrying out the invention.
FIG. 2 is a side view of a tyre being imaged.

Referring now to the Figures, which show apparatus for putting the aspects of the invention into effect, FIG. 1 is an illustration of a first embodiment of a system, in diagrammatic form. A truck 1 has ten wheels indicated at 2, and is travelling in a direction indicated by arrow A. Positioned below the level of the truck body are two imaging devices in the form of digital still cameras 3 and 4, respectively directed at an acute angle at wheels on the left hand side of the truck and the right hand side of the truck. A first series of light sources L1, L2, L3 and L4 are arranged longitudinally spaced along a line running generally parallel to the path of movement of the truck, outside the left hand side of the truck. A second series of light sources L5, L6, L7 and L8 are arranged longitudinally spaced along a line running generally parallel to the path of movement of the truck, outside the right hand side of the truck. Each light source comprises a number of LED elements clustered together, and effectively operates as a point source of non-collimated light.

Figure 3:
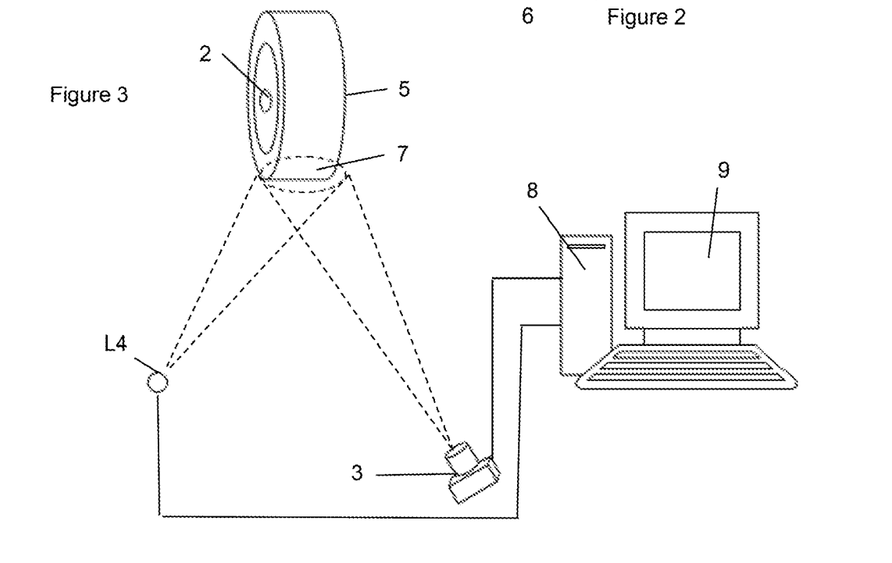
FIG. 3 is a front view of a tyre being imaged.

With reference to FIG. 2, the wheel 2 is fitted with a pneumatic rubber tyre 5 and rotates in the direction of arrow B, whilst moving in a longitudinal direction over a base 6 as indicated by arrow A. Both cameras image a region 7 of the tyre beneath the bodywork of the truck 1. In FIG. 2, the right hand side of the vehicle is illustrated diagrammatically, with camera 4 shown; the other side corresponds. FIG. 3 illustrates diagrammatically the left hand side, showing how the light source L4 is used to illuminate the region 7 of the tyre, whilst the camera 3 captures an image. The operation of the light sources, such as L4 shown in FIG. 3, and the cameras, such as camera 3 shown in FIG. 3 are controlled by a data processing unit 8, which also receives the image data from the cameras and can manipulate the data and calculate tread depths. Image data and other data can be displayed on a screen 9.

Figure 4:
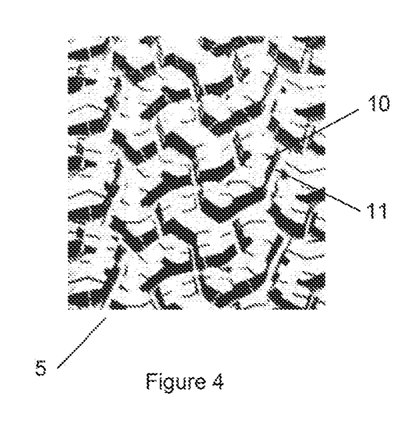
FIG. 4 shows a portion of a vehicle tyre.
Figure 5:
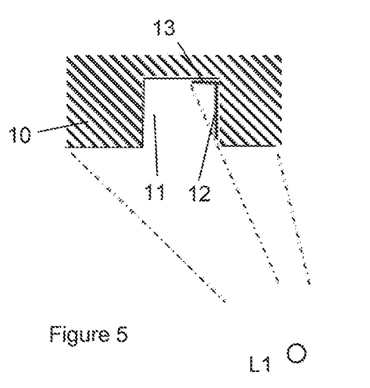
FIG. 5 shows how a shadow is formed.

FIG. 4 shows a portion of the tyre 5, which has blocks of tread 10 separated by gaps 11. FIG. 5 shows how shadows are formed when the surface of the tyre 5 is illuminated by a light source such as L1. There is a shadow portion 12 extending down the side of the tread gap 11, and a shadow portion 13 extending part way across the base. As the depth of the tread gap 11 becomes less, with wear of the tyre, both shadows shorten.

As the wheel rotates, different portions of the surface of the tyre come successively into the fields of view cameras 3 and 4. The light sources are operated sequentially as described below with reference to FIG. 8, under the control of the data processing unit 8.

Figure 6:
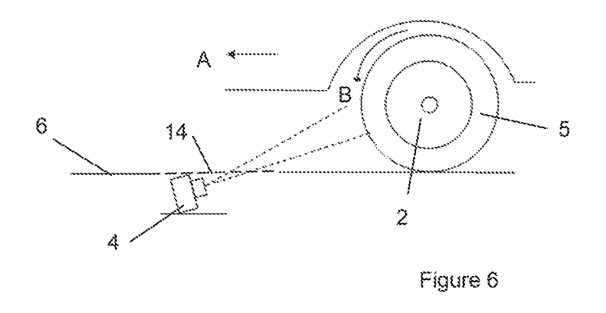
FIG. 6 shows an alternative configuration for mounting an imaging device.

FIG. 6 show an alternative arrangement similar to FIG. 2, in which the camera 4 is recessed below the surface 6. The camera may be covered by a window 14 of toughened glass or the like, so that it will not be damaged by the wheel and tyre passing overhead.

Figure 7:
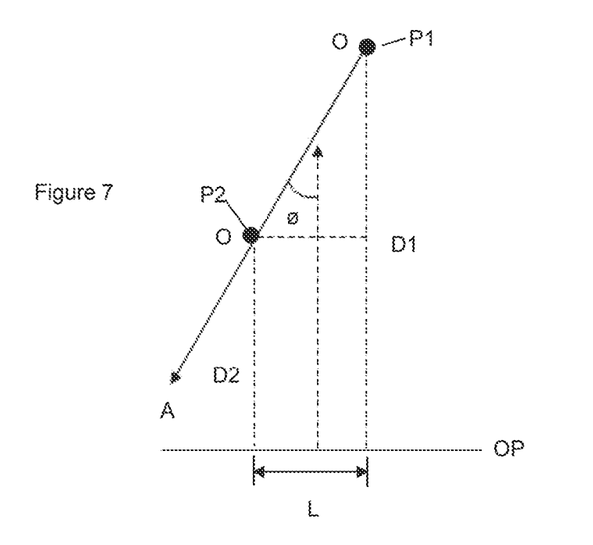
FIG. 7 is a diagram illustrating a system of distance measurement.

FIG. 7 illustrates a system for detecting the distance of an object O. An observation plane OP is arranged at an acute angle ø to the path of movement B of a tyre The distance D1 from the observation plane to a starting point, P1, where the taking of images is triggered, is known from a calibration step. When the object O has moved along the path of movement A to a point P2, the distance D2 of the object from the observation plane OP is related to the distance L across the observation plane OP by the following:

$$D2=D1-L\times\cotan\ ø$$

Accordingly, if the distance L is measured, the distance D2 can be calculated. In practice a camera will be positioned on the observation plane and the true distance L will be related to the distance apparent on the image, such as a number of pixels. The direction the lens of the camera is facing will be at the angle ø to the path of movement B. The object O could be anything suitable, such as the centre of the wheel as identified in the images.

Figure 8:
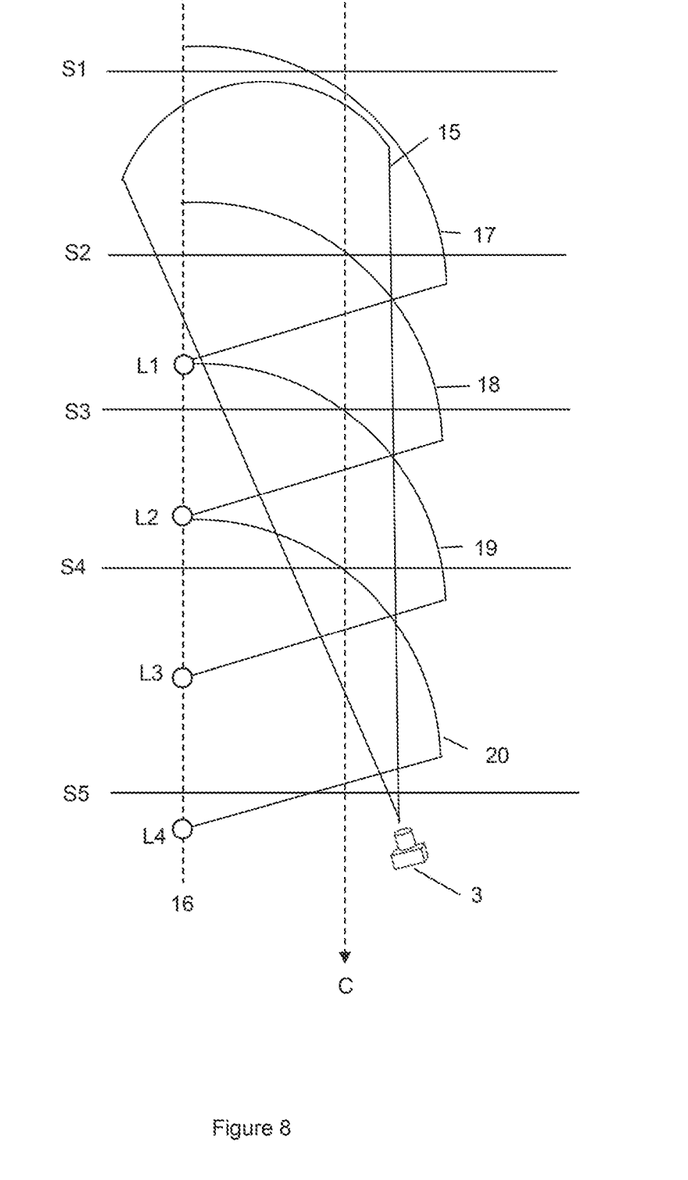
FIG. 8 shows in detail the arrangement of light sources, imaging device and sensors.

FIG. 8 shows the arrangement of the camera 3 and the light sources L1 to L4 in more detail. The arrangement for the camera 4 and light sources L5 to L8 corresponds. The path of travel of a tyre being imaged is indicated at C. The field of view of the camera is indicated by segment 15 and is arranged so that over a considerable length of its path or travel, the tyre lies within this field of view. The light sources L1 to L2 are positioned at equal spacings along a line 16 which is parallel to line of travel C of the tyre, and displaced to the left of that line of travel. The sources of light L1, L2, L3 and L4, illuminate segments marked respectively as 17, 18, 19 and 20. These segments of illumination overlap and are directed at acute angles to the path of travel of the tyre. Between them, the segments of illumination cover the entire path of travel of the tyre which falls within the field of view of the camera.

Also provided at spaced intervals along a line parallel to the path of travel of the tyre, are sensors S1, S2, S3 and S4 which detect the presence of the wheel/tyre. The sensors are all in communication with the data processing 8. Initially, the light sources L1 to L4 are not activated. As the tyre enters the system, it triggers sensor S1. This communicates with the data processing unit and activates light source L1. As the tyre moves forwards, it triggers sensor S2, which causes light source L1 to be de-activated and light source L2 to be activated. This may be just at or after the point when the tyre enters the segment of illumination 18 of light source L2, where there is an overlap with the segment of illumination 17 of light source L1. As the tyre moves further forwards, it triggers sensor S3, which causes light source L2 to be de-activated and light source L3 to be activated. This may be just at or after the point when the tyre enters the segment of illumination 19 of light source L3, where there is an overlap with the segment of illumination 18 of light source L2. As the tyre moves further forwards, it triggers sensor S4, which causes light source L3 to be de-activated and light source L4 to be activated. This may be just at or after the point when the tyre enters the segment of illumination 20 of light source L4, where there is an overlap with the segment of illumination 19 of light source L3.

Finally a fifth sensor S5 is provided which detect the presence of the wheel/tyre as it leaves the region where images are being captured. This de-activates light source L4 and may also de-activate operation of the camera.

It will be appreciated that the distance between the axles on a vehicle may be such that whilst images are still being taken of the front wheel, the next wheel may move into the regions where images are being captured. This second wheel will trigger the first sensor S1 and that in turn will activate the first light source L1. The light source should be arranged so that, at this point, light source L2 is de-activated. Light source L3 may be still activated whilst image are being captured of the front wheel but the arrangement is such that the segment of illumination of light source L3 does not overlap with the segment of illumination of light source L1.

Thus, in general where there are wheels spaced longitudinally of a vehicle, a leading wheel may still be within the zone of illumination of one light source, and being illuminated by that light source, whilst a trailing wheel may be within the zone of illumination of an earlier light source in the series, and being illuminated by that previous light source, provided that there is no overlap between the zones of illumination of the one light source and the earlier light source.

In addition to measuring the tread depth of the tyre, the system may also check for anomalies on the image of the tyre. To do this, in one embodiment the system generates a "flattened out" rectangular greyscale image of the tyre periphery, corresponding to exactly one complete revolution of the tyre. Using deterministic methods, the system identifies anomalies on the tread. The system may use a set of a plurality of types of anomaly, for example about ten different types. For each anomaly identified on the tread there is given a classification for the type of anomaly as well as the boundary of the area of the anomaly.

The analysis and interpretation of the anomalies consists of several specialised detectors which run sequentially, trying to classify anomalies. For example, as a first step the system may look for bare cords by picking out any long, narrow anomalies which show pixel values of intensities significantly greater than their surroundings. Once bare cords have been removed, the system attempts to detect the area boundaries of each anomaly, by looking at different thresholds of what will be considered "abnormal" and counting the connected regions this produces. By way of example, a detector searching for cuts in the tyre picks out any anomalies which are long and narrow and which have darker pixel values on the original image than their surroundings.

In one embodiment, an algorithm consists of two parts. Firstly, a synthetic image is created of the tyre tread pattern from the rectangular greyscale image mentioned above. This is subtracted from the input image to give an anomaly detection image. Secondly, the anomalies revealed in this image are analysed and interpreted and the anomalies are classified.

As noted above, in a first step the system generates a "flattened out" rectangular greyscale image of the tyre periphery, corresponding to exactly one complete revolution of the tyre, i.e. the tread is affectively unrolled into a strip. To create the synthetic image of the tyre tread, in one embodiment each vertical column A of pixels in the original image, in the region of the anomaly, is replaced by a similar column B, of pixels from a different part of the image, which contains the same part of the track pattern, but with no anomalies. To do this, B is the column of pixels which is most similar to A (in terms of the squared error of the pixel values), yet still is further away from A than a certain threshold. Optimisations of this include separately considering blocks of rows between tyre grooves.

By subtracting this synthetic image from the original one, the tread pattern is largely removed from the image, and only the anomalies are left. These remaining anomalies are then finally classified into a set of hard coded groups, depending on their size, shape and whether they cover/lie within a tread groove. An enhancement to this will be to use a Neural network approach to use data of recorded faulty types to automatically determine the categorisation of the anomaly.

This procedure is of use independently, without the particular system described for measurement of tread depth, and regardless of the system used for obtaining an image of the entire periphery of the tyre.

The invention may be viewed from a number of different aspects. Viewed from another aspect of the invention there is provided apparatus for assessing the condition of a vehicle tyre, the periphery of the tyre being provided with tread portions separated by tread gaps; wherein the apparatus comprises a light source which is displaced to a side of the tyre so as to illuminate a portion of the periphery of the tyre, the light source causing shadows to be cast in the tread gaps between tread portions; and the apparatus further comprises an imaging device which is operable to collect an image of at least part of the illuminated portion of the periphery of the tyre; and data processing apparatus which is configured to analyse the image so as to determine the extent of the shadow in a tread gap so as to provide an indication of the depth of the tread gap; and the apparatus is arranged to repeat this process for at least one other portion of the periphery of the tyre; wherein the tyre is arranged to rotate and move longitudinally along a path of movement over a base, the light source and the imaging device are fixed, the light source is displaced at an acute angle away from said path of movement, and the distance between the tyre and the imaging device varies as the tyre moves along said path of movement; and the apparatus is arranged so that images are collected by the imaging device in respect of a plurality of different portions of the periphery of the tyre whilst the tyre completes at least about half of a complete revolution, each image being collected whilst the respective portion faces in a direction along the path of movement. Preferably, a second light source is provided and the arrangement is that they do not interfere with each other in such a way as to remove or diminish the shadows that are required for putting the invention into effect. Preferably, a plurality of light sources are positioned to one side of the path of movement of the tyre, each light source being a point source of non-collimated light and directing light at an acute angle to the path of movement of the tyre; the light sources being spaced from each other in a direction which is generally parallel to the path of movement of the tyre; and a control system is configured to activate the light sources sequentially whilst the tyre moves along said path of movement so that, only one light source illuminates the tyre when images are being captured by the imaging device.

Viewed from another aspect of the invention there is provided apparatus for assessing the condition of a vehicle tyre on a wheel, whilst the wheel is rotating and the wheel is moving longitudinally along a path of movement over a base, wherein the apparatus comprises a light source displaced at an acute angle to one side of said path of movement so as to illuminate portions of the outer surface of the tyre which face in a direction along the path of movement; an imaging device and a control unit which controls the imaging device to collect multiple images, substantially in focus, of the portions of the outer surface of the tyre, whilst the tyre is rotating and completes at least about half of a complete revolution, each image being of different portions spaced around said outer surface of the tyre and each image being collected whilst the respective portion faces along the path of movement; the light source is controlled by the control unit to be operated whilst the imaging device is operated to collect each image, the light source causing shadows to be cast in the tread gaps between tread portions; and the apparatus includes data processing apparatus which is controlled to analyse the multiple images, at least some of which include a said shadow, the data processing apparatus determining the extent of the shadow in a tread gap so as to provide an indication of tyre tread depth at different positions spaced around the outer surface of the tyre. Preferably, a second light source is provided and the arrangement is that they do not interfere with each other in such a way as to remove or diminish the shadows that are required for putting the invention into effect. Preferably, a plurality of light sources are positioned to one side of the path of movement of the tyre, each light source being a point source of non-collimated light and directing light at an acute angle to the path of movement of the tyre; the light sources being spaced from each other in a direction which is generally parallel to the path of movement of the tyre; and a control system is configured to activate the light sources sequentially whilst the tyre moves along said path of movement so that, only one light source illuminates the tyre when images are being captured by the imaging device.

Viewed from another aspect, the invention provides a process for assessing the condition of a vehicle tyre, the periphery of the tyre being provided with tread portions separated by tread gaps; wherein a light source is displaced to a side of the tyre so as to illuminate a portion of the periphery of the tyre, the light source causing shadows to be cast in the tread gaps between tread portions; an imaging device is operated to collect an image of at least part of the illuminated portion of the periphery of the tyre; and the image is analysed by data processing apparatus which determines the extent of the shadow in a tread gap so as to provide an indication of the depth of the tread gap; and the process is repeated for at least one other portion of the periphery of the tyre; wherein the tyre is rotating and moving longitudinally along a path of movement over a base, the light source and the imaging device are fixed, the light source is displaced at an acute angle away from said path of movement, and the distance between the tyre and the imaging device varies as the tyre moves along said path of movement; and images are collected by the imaging device in respect of a plurality of different portions of the periphery of the tyre whilst the tyre completes at least about half of a complete revolution, each image being collected whilst the respective portion faces in a direction along the path of movement. Preferably, a second light source is provided and the arrangement is that they do not interfere with each other in such a way as to remove or diminish the shadows that are required for putting the invention into effect. Preferably, a plurality of light sources are positioned to one side of the path of movement of the tyre, each light source being a point source of non-collimated light and directing light at an acute angle to the path of movement of the tyre; the light sources being spaced from each other in a direction which is generally parallel to the path of movement of the tyre; and a control system is configured to activate the light sources sequentially whilst the tyre moves along said path of movement so that, only one light source illuminates the tyre when images are being captured by the imaging device.

Viewed from another aspect the invention provides a method for assessing the condition of a vehicle tyre on a wheel, whilst the wheel is rotating and the wheel is moving longitudinally along a path of movement over a base, the tyre having an outer surface which contacts the base, the outer surface carrying tread portions; wherein a light source is displaced at an acute angle to one side of said path of movement so as to illuminate portions of the outer surface of the tyre which face along the path of movement; an imaging device is operated to collect multiple images, substantially in focus, of the portions of the outer surface of the tyre, whilst the tyre is rotating and completes at least about half of a complete revolution, each image being of different portions spaced around said outer surface of the tyre and each image being collected whilst the respective portion faces along the path of movement; the light source is operated whilst the imaging device is operated to collect each image, the light source causing shadows to be cast in the tread gaps between tread portions; and the multiple images, at least some of which include a said shadow, are analysed by data processing apparatus which determines the extent of the shadow in a tread gap so as to provide an indication of tyre tread depth at different positions spaced around the outer surface of the tyre. Preferably, a second light source is provided and the arrangement is that they do not interfere with each other in such a way as to remove or diminish the shadows that are required for putting the invention into effect. Preferably, a plurality of light sources are positioned to one side of the path of movement of the tyre, each light source being a point source of non-collimated light and directing light at an acute angle to the path of movement of the tyre; the light sources being spaced from each other in a direction which is generally parallel to the path of movement of the tyre; and a control system is configured to activate the light sources sequentially whilst the tyre moves along said path of movement so that, only one light source illuminates the tyre when images are being captured by the imaging device.

Viewed from another aspect, the invention provides a method of assessing the condition of a tyre on a wheel which is mounted on a vehicle, while the vehicle is moving and the tyre is rotating and moving longitudinally along a path of movement over a base, the periphery of the tyre having tread portions separated by tread gaps; in which the method comprises using an imaging device to capture images of a plurality of different portions of the periphery of the tyre whilst the tyre completes at least a major part of a complete revolution; there being a plurality of light sources spaced longitudinally, which respectively illuminate different portions of the periphery of the tyre as the moves; and the images are analysed to determine the depth of the tread gaps; wherein each light source directs light at an acute angle to the path of movement of the tyre; when a light source is activated to illuminate a portion of the periphery of the tyre, the light source causes shadows to be cast in the tread gaps between tread portions; the imaging device is operated to collect an image of at least part of the illuminated portion of the periphery of the tyre; and the image is analysed by data processing apparatus which determines the extent of the shadow in a tread gap so as to provide an indication of the depth of the tread gap; and wherein a control system activates the light sources sequentially whilst the tyre moves along said path of movement, so that the light sources do not interfere with each other in such a way as to remove or diminish the shadows cast in the tread gaps between tread portions.

Viewed from another aspect, the invention provides a method of assessing the condition of a tyre on a wheel which is mounted on a vehicle, while the vehicle is moving and the tyre is rotating and moving longitudinally along a path of movement over a base, the periphery of the tyre having tread portions separated by tread gaps; in which the method comprises using an imaging device to capture images of a plurality of different portions of the periphery of the tyre whilst the tyre completes at least a major part of a complete revolution, the images being captured whilst a light source is activated to illuminate the portions of the periphery of the tyre; and the images are analysed to determine the depth of the tread gaps; wherein a series of a plurality of light sources is positioned to one side of the path of movement of the tyre, each light source directing light at an acute angle to the path of movement of the tyre; the light sources being spaced from each other in a longitudinal direction; a control system is configured to activate the light sources sequentially whilst the tyre moves along said path of movement, so that only one of said light sources of the series illuminates the tyre when images are being captured by the imaging device; when a light source is activated to illuminate a portion of the periphery of the tyre, the light source causes shadows to be cast in the tread gaps between tread portions; the imaging device is operated to collect an image of at least part of the illuminated portion of the periphery of the tyre; and the image is analysed by data processing apparatus which determines the extent of the shadow in a tread gap so as to provide an indication of the depth of the tread gap.

Preferably, each light source is a source of non-collimated light. Preferably, each light source is a point source of light. In some embodiments of this aspect of the invention, each point source of light is provided by a plurality of light emitting sources which are grouped together so as to function as a point light source.

In preferred embodiments of the invention, there is provided a system for measuring the depth of tread of a tyre on a wheel of a vehicle whilst the wheel is rotating and moving along the ground. An imaging device such as a camera captures images whilst the tyre rotates for at least the major part of its circumference. Light sources are spaced longitudinally and are directed at an acute angle to the path of the tyre, to illuminate the tyre whilst images are captured. The images are analysed by data processing apparatus and the tread depth is determined from the length of shadows in the gaps between tread blocks. The light sources are activated and de-activated sequentially, for example in accordance with signals from longitudinally spaced sensors which detect the presence of the tyre, so that when an image is captured of a portion of the tyre tread, only one light source is activated to illuminate that portion of the tyre tread.

It will be appreciated that when it is stated that in accordance with an broad aspect of the invention, only one of the light sources of a series illuminates the tyre when images are being captured by the imaging device, in a general sense this may mean that when an image is captured of a portion of the tyre tread, for use in analysing the tread depth, only one light source is activated to illuminate that portion of the tyre tread. There could be another light source which illuminates another portion of the tyre or another portion of the tyre tread, provided that two light sources, at different positions, do not illuminate the same portion of the tread of the tyre whilst an image is being captured of that portion which is used when analysing the depth of tyre tread. The light sources do not interfere with each other in such a way as to remove or diminish the shadows cast in the tread gaps between tread portions, whilst an image is being captured.

The invention claimed is:

1. A method of assessing the condition of a tyre on a wheel which is mounted on a vehicle, while the vehicle is moving and the tyre is rotating and moving longitudinally along a path of movement over a base, the periphery of the tyre having tread portions separated by tread gaps; in which the method comprises using an imaging device to capture images of a plurality of different portions of the periphery of the tyre while the tyre completes at least a major part of a complete revolution, the images being captured while a light source is activated to illuminate the portions of the periphery of the tyre; and the images are analysed to determine the depth of the tread gaps; wherein
a series of a plurality of light sources is positioned to one side of the path of movement of the tyre, each light source being a point source of non-collimated light and directing a light beam onto the periphery of the tyre, the light beam having a principle direction opposing the path of movement of the tyre; the light sources being spaced from each other in a longitudinal direction;
a control system is configured to activate the light sources sequentially while the tyre moves along said path of movement, so that only one of said light sources of the series illuminates a portion of the periphery of the tyre when an image is being captured by the imaging device of that portion of the periphery of the tyre;
when a light source is activated to illuminate a portion of the periphery of the tyre, the light source causes shadows to be cast in the tread gaps between tread portions;
the imaging device is operated to collect an image of at least part of the illuminated portion of the periphery of the tyre; and
the image is analysed by a data processing apparatus which determines the extent of the shadow in a tread gap so as to provide an indication of the depth of the tread gap;
wherein the analyzing of the captured images comprises:
determining a distance the tyre shifts across a field of view of the imaging device between successively captured images as the tyre moves along the path of movement towards the imaging device;
calculating respective positions of the tyre in the respective captured images along the path of movement using the determined distance the tyre shifts; and
determining a length of the shadow using the calculated respective positions of the tyre.

2. The method of claim 1, wherein the imaging device captures images of adjacent portions of the periphery of the tyre while the tyre completes a complete revolution, so that there is a continuous series of images covering the entire periphery of the outer surface of the tyre.

3. The method of claim 1, wherein each light source provides a zone of illumination and the path of movement of the tyre extends through the plurality of zones, so that the tyre moves from one zone of illumination to the next, in series; and the illumination zones overlap.

4. The method of claim 3, wherein the tyre is in one illumination zone of one light source, with the one light source being activated; the tyre moves to a region where there is an overlap between said one illumination zone and a subsequent illumination zone of a subsequent light source; and said one light source is de-activated and the second light source is activated.

5. The method of claim 4, wherein a series of sensors is provided, each sensor communicating with the control system for the purposes of controlling activation and de-activation of the light sources; a first of said sensors detecting movement of a tyre into the zone of illumination of the first light source in the series; subsequent sensors detecting movement of the tyre into regions of overlap between the zones of illumination of light sources; and a final sensor detecting movement of the tyre to a position where imaging is terminated.

6. The method of claim 3, wherein the method is repeated for a second tyre on a second wheel mounted on the vehicle, spaced longitudinally from the first wheel; wherein the second tyre is in a first illumination zone of a first light source in the series of light sources, while that first light source is activated; and the first tyre is in a subsequent illumination zone of a subsequent light source in the series of light sources, while that subsequent light source is activated; the subsequent illumination zone not overlapping with the first illumination zone.

7. The method of claim 1, wherein the imaging device is positioned to one side of the path of movement of the tyre, and is directed at an acute angle to the path of movement of the tyre.

8. The method of claim 7, wherein the imaging device is positioned on one side of the path of movement of the tyre, and the plurality of light sources are positioned on the opposite side of the path of movement of the tyre.

9. The method of claim 8, wherein the imaging device is displaced inwardly from one side of the vehicle, and the light sources are displaced outwardly from said one side of the vehicle.

10. The method of claim 1, wherein the method is repeated for another tyre on another wheel mounted on the vehicle, the first tyre being on one side of the vehicle and said other tyre being on the other side of the vehicle, said other tyre being illuminated by a second series of light sources for said other side of the vehicle, and images of said other tyre being captured by a second imaging device for said other side of the vehicle.

11. The method of claim 1, wherein:
a portion of the base along the path of movement of the tyre is transparent,
the transparent portion of the base is between the path of movement of the tyre and the imaging device, and
the field of view of the imaging device includes at least part of the transparent portion of the base.

12. The method of claim 1, further comprising:
using the imaging device to capture images of a plurality of different portions of the periphery of the tyre while the tyre completes a complete revolution, and
generating with the data processing apparatus a rectangular greyscale image of the tyre periphery corresponding to exactly one complete revolution of the tyre using the captured images of a plurality of different portions of the periphery of the tyre.

13. The method of claim 12, further comprising: creating a synthetic image of the tyre tread pattern using the rectangular greyscale image.

14. The method of claim 1, wherein the determined distance the tyre shifts is measured in pixels.

15. Apparatus for assessing the condition of a vehicle tyre on a wheel, while the tyre is rotating and moving longitudinally along a path of movement over a base, the periphery of the tyre having tread portions separated by tread gaps; in which the apparatus comprises an imaging device and a light source, the imaging device being arranged to capture images of a plurality of different portions of the periphery of the tyre while the tyre completes at least a major part of a complete revolution, the images being captured while the light source is activated to illuminate the portions of the periphery of the tyre; and a data processing system configured to process the images to enable the depth of the tread gaps to be determined; wherein a series of a plurality of light sources is positioned to one side of the path of movement of the tyre, each light source being a point source of non-collimated light and directing a light beam onto the periphery of the tyre, the light beam having a principle direction opposing the path of movement of the tyre; the light sources being spaced from each other in a longitudinal direction;

a control system is configured to activate the light sources sequentially while the tyre moves along said path of movement, so that only one of said light sources of the series illuminates a portion of the periphery of the tyre when an image is being captured by the imaging device of that portion of the periphery of the tyre;

wherein when a light source is activated to illuminate a portion of the periphery of the tyre, the light source causes shadows to be cast in the tread gaps between tread portions; the imaging device being arranged to collect an image of at least part of the illuminated portion of the periphery of the tyre; and a data processing system is configured to analyse the image so as to determine the extent of the shadow in a tread gap so as to provide an indication of the depth of the tread gap;

wherein processing the captured images comprises:
determining a distance the tyre shifts across a field of view of the imaging device between successively captured images as the tyre moves along the path of movement towards the imaging device;

calculating a distance the tyre has traveled along the path of movement using the determined distance the tyre shifts; and determining a length of the shadow using the determined distance the tyre has traveled.

16. The apparatus of claim 15, for assessing the condition of a second tyre on a second wheel which is mounted on the opposite side of vehicle, while the vehicle is moving and the second tyre is rotating and moving longitudinally along a second path of movement over a base, the periphery of the second tyre having tread portions separated by tread gaps; in which the apparatus comprises a second imaging device and a second series of a plurality of second light sources, the second imaging device being arranged to capture images of a plurality of different portions of the periphery of the second tyre while the second tyre completes at least a major part of a complete revolution, the images being captured while a second light source is activated to illuminate the portions of the periphery of the second tyre; and a data processing system is configured to process the images to enable the depth of the tread gaps to be determined; wherein the second series of the plurality of second light sources is positioned to one side of the second path of movement of the second tyre, each light source being a point source of non-collimated light and directing light at an acute angle to the second path of movement of the second tyre; the second light sources being spaced from each other in a direction which is generally parallel to the second path of movement of the tyre;

a second control system is configured to activate the second light sources sequentially while the second tyre moves along said second path of movement so that only one of said second light sources illuminates the second tyre when an image is captured by the second imaging device;

when a second light source is activated to illuminate a portion of the periphery of the second tyre, the second light source causes shadows to be cast in the tread gaps between tread portions of the second tyre; the second imaging device being arranged to collect an image of at least part of the illuminated portion of the periphery of the second tyre; and a second data processing system is configured to analyse the image so as to determine the extent of the shadow in a tread gap so as to provide an indication of the depth of the tread gap of the second tyre.

17. The apparatus of claim 16, wherein the second control system and the second data processing system are the same as those used in respect of the first tyre.

18. The apparatus of claim 15, wherein the imaging device captures images of adjacent portions of the periphery of the tyre while the tyre completes a complete revolution, so that there is a continuous series of images covering the entire periphery of the outer surface of the tyre.

19. A method of assessing the condition of a tyre on a wheel which is mounted on a vehicle, while the vehicle is moving and the tyre is rotating and moving longitudinally along a path of movement over a base, the periphery of the tyre having tread portions separated by tread gaps; in which the method comprises using an imaging device to capture images of a plurality of different portions of the periphery of the tyre while the tyre completes at least a major part of a complete revolution; there being a plurality of light sources spaced longitudinally, which respectively illuminate different portions of the periphery of the tyre as the tyre moves; and the images are analysed to determine the depth of the tread gaps;

wherein each light source directs a light beam onto the periphery of the tyre, the light beam having a principle direction opposing the path of movement of the tyre; when a light source is activated to illuminate a portion of the periphery of the tyre, the light source causes shadows to be cast in the tread gaps between tread portions; the imaging device is operated to collect an image of at least part of the illuminated portion of the periphery of the tyre; and the image is analysed by a data processing apparatus which determines the extent of the shadow in a tread gap so as to provide an indication of the depth of the tread gap; and wherein a control system activates the light sources sequentially while the tyre moves along said path of movement, so that the light sources do not interfere with each other in such a way as to remove or diminish the shadows cast in the tread gaps between tread portions;

wherein analyzing the images to determine the depth of the tread gaps includes:

determining a tyre diameter or radius by comparing the dimensions of the tyre in an image to a scale mounted at a known distance from the imaging device, wherein the scale appears in at least one of the images; and determining a length of the shadow using the determined diameter or radius of the tyre.

20. The method of claim 19, wherein analyzing the images to determine the depth of the tread gaps further includes filtering the images to detect valid groove shadows as opposed to other dark areas.

* * * * *